(12) United States Patent
Klassen (10) Patent No.: US 11,289,972 B2
(45) Date of Patent: Mar. 29, 2022

(54) ELECTRIC MOTOR WITH INTEGRATED BRAKE

(71) Applicant: Genesis Robotics and Motion Technologies Canada, ULC, Langley (CA)

(72) Inventor: James Klassen, Surrey (CA)

(73) Assignee: Genesis Robotics & Motion Technologies Canada, ULC, Langley (CA)

( * ) Notice: Subject to any disclaimer, the term of this patent is extended or adjusted under 35 U.S.C. 154(b) by 72 days.

(21) Appl. No.: 16/764,845

(22) PCT Filed: Nov. 21, 2018

(86) PCT No.: PCT/IB2018/059187
§ 371 (c)(1),
(2) Date: May 16, 2020

(87) PCT Pub. No.: WO2019/102378
PCT Pub. Date: May 31, 2019

(65) Prior Publication Data
US 2020/0343788 A1    Oct. 29, 2020

Related U.S. Application Data

(60) Provisional application No. 62/589,548, filed on Nov. 21, 2017.

(51) Int. Cl.
*H02K 7/10* (2006.01)
*H02K 7/102* (2006.01)

(52) U.S. Cl.
CPC ........... *H02K 7/1023* (2013.01); *H02K 7/102* (2013.01); *H02K 7/1026* (2013.01)

(58) Field of Classification Search
CPC .... H02K 7/102; H02K 7/1021; H02K 7/1023; H02K 7/1026; F16D 11/14; F16D 27/01;
(Continued)

(56) References Cited

U.S. PATENT DOCUMENTS 2,656,026 A * 10/1953 Feiertag ................ F16D 63/002
192/21.5
2,962,144 A * 11/1960 Manfred ................ F16D 27/004
192/84.31
(Continued)

FOREIGN PATENT DOCUMENTS

JP       S59113735 A    6/1984
WO    WO2004047255 A2  6/2004
(Continued)

OTHER PUBLICATIONS

Extended European Search Report and Opinion received for EP Application No. 18880497.5, dated Nov. 27, 2020, 7 Pages.
(Continued)

*Primary Examiner* — Burton S Mullins (57) ABSTRACT

An electric motor comprising: a first element having at least one electromagnet, a second element, rotatable relative to the first element about an axis, the second element comprising at least one permanent magnet, wherein the electric motor is arranged to generate a torque by applying a rotating magnetic field to the second element, and a friction member coupled to the first element such that the friction member is non-rotatable relative to the first element about the axis, the friction member comprising a magnetically susceptible material and being biased by a first biasing force toward the second element, wherein the first element, the second element and the friction member are configured such that: when (Continued)

the electromagnet is not energized, the first biasing force causes the friction member to contact the second element to generate a braking torque.

22 Claims, 5 Drawing Sheets

(58) Field of Classification Search
CPC .. F16D 27/00; F16D 27/004; F16D 2027/007; F16D 2027/008
USPC ......... 310/77; 188/161, 267; 192/84.1, 84.3, 192/84.31
See application file for complete search history.

(56) References Cited

U.S. PATENT DOCUMENTS

| | | | | |
|---|---|---|---|---|
| 3,763,968 | A * | 10/1973 | Noly | F16D 55/02 188/171 |
| 5,121,018 | A * | 6/1992 | Oldakowski | F16D 55/02 188/161 |
| 5,497,040 | A | 3/1996 | Sato | |
| 6,483,217 | B1 * | 11/2002 | Roth-Stielow | F16D 55/28 188/161 |
| 6,867,946 | B1 * | 3/2005 | Berding | F16D 63/006 188/156 |
| 7,520,373 | B2 * | 4/2009 | Hill | F16D 27/112 192/84.31 |
| 2013/0186726 | A1 * | 7/2013 | Collins | F16D 27/06 192/84.9 |
| 2014/0375151 | A1 * | 12/2014 | Furlan | H02K 7/1025 310/49.54 |

FOREIGN PATENT DOCUMENTS

| | | |
|---|---|---|
| WO | WO2015113163 A1 | 8/2015 |
| WO | WO2017197497 A1 | 11/2017 |

OTHER PUBLICATIONS

International Search Report and Written Opinion received for PCT patent application No. PCT/IB2018/059186, dated Mar. 12, 2019, 13 pages.

International Search Report and Written Opinion received for PCT patent application No. PCT/IB2018/059187, dated Mar. 12, 2019, 8 pages.

* cited by examiner

ELECTRIC MOTOR WITH INTEGRATED BRAKE

CROSS-REFERENCE TO RELATED APPLICATIONS

This application is a filing under 35 U.S.C. 371 as the National Phase of International Patent Application No. PCT/IB2018/059187, filed on Nov. 21, 2018, which claims the benefit of and priority to U.S. Provisional Application No. 62/589,548, filed on Nov. 21, 2017, both of which are incorporated herein by reference in their entirety.

FIELD OF THE INVENTION

The present invention relates to an electric motor having an integrated brake.

BACKGROUND OF THE INVENTION

Electric motors are commonly used in many actuator applications including in robotic arms. In some cases, it is required that, when an electric motor is not being driven, it should be held stationary so that the drive shaft of the electric motor cannot be freely rotated by exterior torque. Existing systems for preventing movement of an electric motor tend to involve a brake arrangement located separately from the motor, which can increase the number of parts and space required for the overall arrangement. An improved motor and brake arrangement is desirable.

SUMMARY OF THE INVENTION

A first aspect of the invention provides an electric motor comprising any or all of the following features: a first element having at least one electromagnet, a second element, rotatable relative to the first element about an axis, the second element comprising at least one permanent magnet, wherein the electric motor is arranged to generate a torque by applying a rotating magnetic field to the second element, and a friction member coupled to the first element such that the friction member is non-rotatable relative to the first element about the axis, the friction member comprising a magnetically susceptible material and being biased by a first biasing force toward the second element, wherein the first element, the second element and the friction member are configured such that: when the electromagnet is not energized, the first biasing force causes the friction member to contact the second element to generate a braking torque, and when the electromagnet is energized, the friction member is biased by a second biasing force generated by the electromagnet such that the braking torque is reduced.

With such an arrangement, the present invention provides a more compact electric motor and braking system, since the friction member can act directly on an element of the electric motor, rather than requiring a separate brake structure.

The braking system may prevent free rotation of the second element relative to the first element when the electromagnet is not energized and/or may provide no braking torque between the friction member and the second element when the electromagnet is energized.

The first element may be a stator of the electric motor and the second element may be a rotor of the electric motor.

The at least one permanent magnet may attract the friction member such that the friction member is biased toward the second element. With such an arrangement, the permanent magnet of the electric motor serves a dual purpose of providing the drive torque of the electric motor and also actuating the friction member. Therefore, the number of permanent magnets required may be reduced, resulting in a more lightweight and compact arrangement.

The electric motor may further comprise a third element, which is fixed relative to the first element, and which is disposed on an opposite side of the second element to the first element, the second element having a further electromagnet arranged to generate the rotating magnetic field. Thus there is provided a complete arrangement for driving the second element in order to produce a drive torque of the electric motor and also providing an electromagnet for separating the friction member from the second element. By using separate electromagnets for providing the driving torque and attracting the friction member, the friction member may be more reliably retained in a position where it is separated from the second element while the motor is generating a driving torque.

The friction member may be attached to the first element and, when the electromagnet is not energized, the friction member may deform such that the friction member contacts the second element. Therefore, the friction member can be resiliently held in place at a first portion, while a second portion of the friction member moves into and out of contact with the second element.

The friction member can be fixedly mounted relative to the first element at a first portion of the friction member and can comprise elongate voids, extending in a direction away from the first portion. The elongate voids can allow the friction member to expand during propagation of a wavefront away from the first portion when the friction member is transitioning between a position in which a braking torque is generated and position in which a lesser or zero braking torque is generated. The elongate voids can also act as flux restrictors between radially aligned magnetic poles of the first element. This may reduce the energy required for moving the friction member away from the second element.

Since the stator posts may be circumferential, the radially elongated elongate voids should not significantly restrict the magnetic flux from the secondary stator.

The elongate voids may extend toward a second, movable portion of the friction member, which is movable by the biasing force toward the second element.

The electric motor may further comprise a peel shim arranged between the friction member and the second element, the peel shim being arranged to separate a portion of the friction member from the second element. The peel shim can effectively reduce the force necessary for separating the friction member from the second member and, hence the amount of current or power required to be applied to the electromagnet in order to create disengagement of the friction member from the second element.

The peel shim may exhibit rotational symmetry about an axis of the electric motor. With such an arrangement, the friction member can contact the second element to distribute the friction causing the braking torque evenly.

The peel shim may have a tapered portion. The tapered portion may allow the friction member to be separated from the second element in a wavelike fashion and thereby further reduce the power required for the electromagnet to disengage the friction member from the second element.

In the case that the electric motor is an axial flux motor, the peel shim may be substantially disk shaped or sector shaped, optionally a disc or sector shape having a tapered radially outer region.

In the case that the electric motor is a radial flux motor, the peel shim may have the form of a sleeve or a curved sheet, optionally a sleeve or curved sheet having a tapered region at an axial end of the peel shim.

The tapered portion of the peel shim may taper to an angle less than 5°. This may further improve the amount of power required by the electromagnet to separate the friction member from the second element.

The first element may comprise a plurality of concentric windings, the windings arranged such that the current in a first winding is in an opposite direction to the current in at least one second winding radially adjacent to the first winding. With such an arrangement, the first element can generate a more uniform electromagnetic field for attracting the friction member and the magnetic field may affect the second element to a lesser extent.

The first element may comprise a plurality of concentric posts disposed between the concentric windings, the pluralities of the posts alternating radially. With such an arrangement, the magnetic field may be made stronger for a given current, improving the efficiency of the motor.

The first element may comprise a radial slot for receiving windings. With such an arrangement, the windings may be compactly arranged within the first element, giving a more compact overall arrangement.

BRIEF DESCRIPTION OF THE DRAWINGS

Embodiments of the invention will now be described, by way of example only, with reference to the accompanying drawings, in which.

DETAILED DESCRIPTION OF EMBODIMENT(S)

Figure 1:
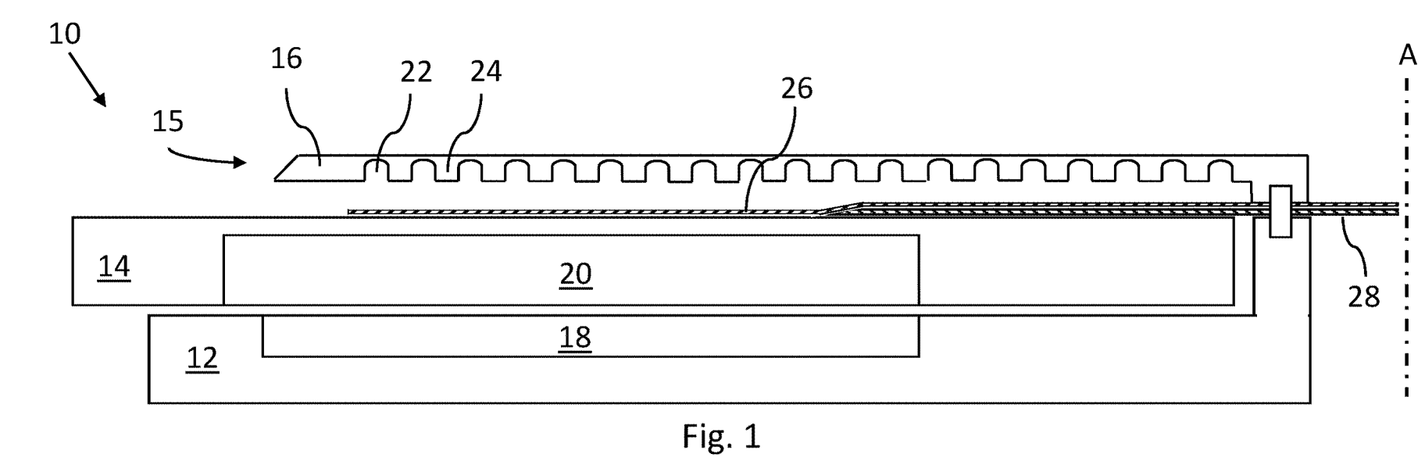
FIG. 1 shows a half cross-section of an axial flux electric motor according to the invention where a braking torque is being generated.
Figure 2:
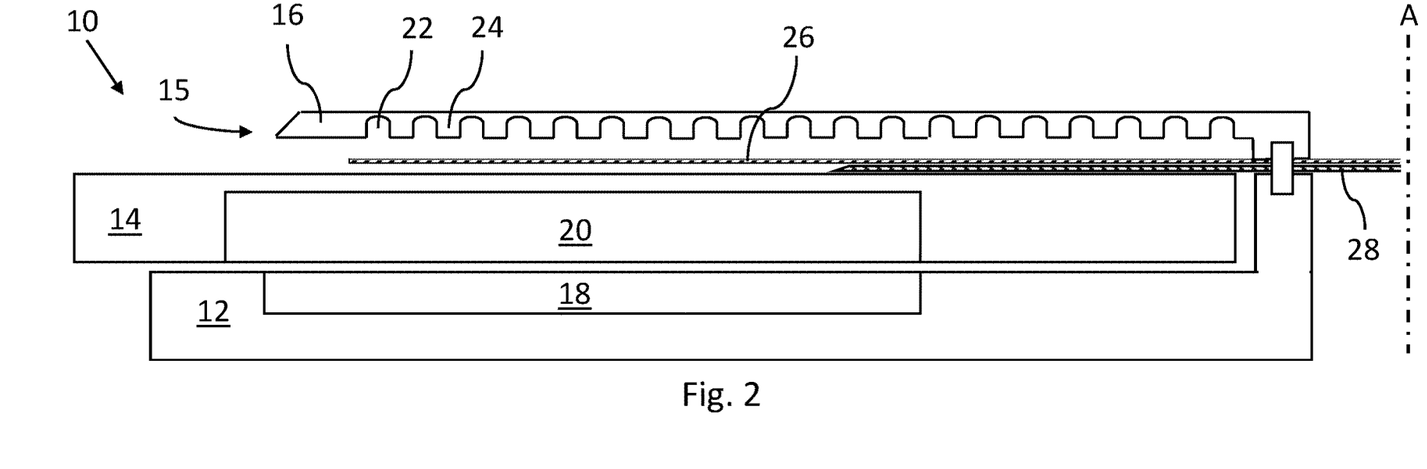
FIG. 2 shows a half cross-section of an axial flux electric motor according to the invention in which a braking torque is not being generated.

FIGS. 1 and 2 show half cross-sections of embodiments of an axial flux electric motor comprising features of the present invention. The electric motor 10 operates by rotating the rotor 14 about the axis A. The motor 10 generates a driving torque by providing a rotating magnetic field with the electromagnet 18 situated in the primary stator 12, which may be considered a drive stator. The rotating magnetic field interacts with the permanent magnet 20 situated within the rotor 14 in order to generate a torque about an axis A. This is commonly referred to as an axial flux motor. Numerous arrangements of axial flux motors are known and the skilled person will be familiar with such arrangements. Intricate details of the axial flux motor arrangement are not described in detail here in the interests of efficiency of the description, but the skilled person will be aware of such arrangements and how to realise them. Examples are described in, for example, WO2017/197497 A1, the contents of which are incorporated herein by reference.

In the arrangement shown in FIG. 1, a braking torque is generated by a friction member 26 impinging upon the rotor 14. This is caused by attraction between the permanent magnet 20 and the friction member 26 due to the friction member 26 being formed from a magnetically susceptible material, such as a ferrous material. However, it is also envisioned that the friction member 26 could be biased toward the rotor 14 by a biasing force generated by other means such as springs or by elastic deformation of the friction member 26.

The friction member 26 maybe separated from the rotor 14, as shown in FIG. 2, by applying a magnetic field to the friction member 26 using the secondary stator 16, which comprises an electromagnet 15 and may be considered a brake stator. The electromagnet 15 of the secondary stator 16 may comprise a plurality of windings, situated in slots 22 and a plurality of stator posts 24. The secondary stator 16 may be rigidly fixed to the primary stator 12.

The friction member 26 may be separated from the rotor 14 across at least a portion of its area by the peel shim 28. FIG. 1 shows that the peel shim 28 has the effect that only an outer portion of the friction member 26 contacts the rotor 14 when the friction member 26 contacts the rotor 14 to generate a braking torque.

Since a portion of the friction member 26 contacts the rotor 14 and is further from the secondary stator 16 and another portion of the friction member 26 is separated from the rotor 14 and is closer to the secondary stator 16, when the electromagnet 15 of the secondary stator 16 is initially energized, the friction member 26 can separate from the rotor 14 in a wave-like fashion, with a line of separation moving radially outwardly and the portion of the friction member 26 in contact with the rotor 14 is gradually reduced. Therefore, the force required to move the friction member 26 from a position in which it contacts the rotor 14 to a position in which the friction member 26 does not contact the rotor 14 is reduced.

The peel shim 28 shown in FIG. 1 is substantially circular and so separates an inner circular portion of the friction member 26 from the rotor 14. Since an outer portion of the friction member 26 is in contact with the rotor 14, the friction generated has a greater moment about the axis A. Therefore, a greater portion of the friction member 26 can be separated from the rotor 14, while providing a sufficient braking torque. By separating a greater portion of the friction member 26 from the rotor 14, the peel shim 28 further reduces the energy required to separate the friction member 26 from the rotor 14.

Alternatively, the peel shim 28 may be annular and may be disposed at a radially outer portion of the friction member 26 so as to separate a radially outer portion of the friction member 26 from the rotor 14.

In this example, the peel shim 28 does not contact the rotor 14.

In a preferred example, the holding current required in order to keep the friction member 28 disengaged from a 200 mm rotor 18 is less than 10 Amps.

Figure 3:
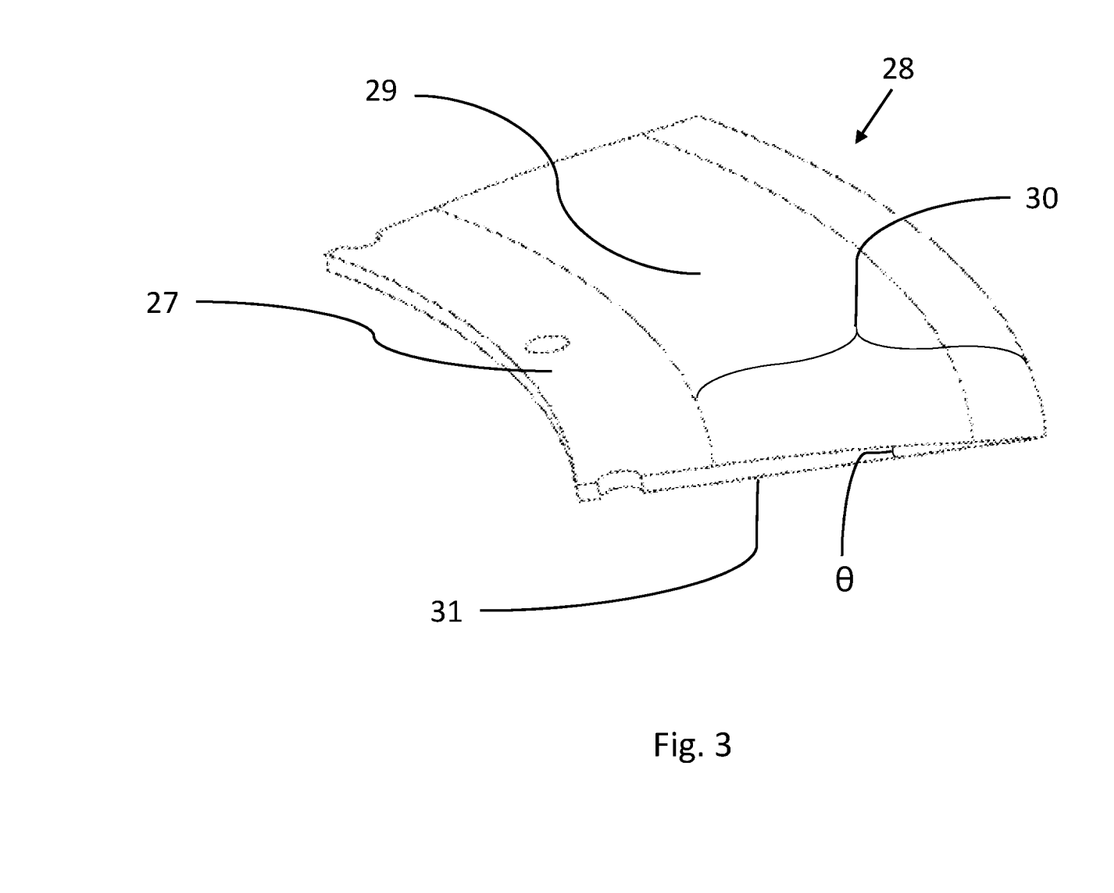
FIG. 3 shows a sector of a peel shim.

FIG. 3 shows a sector of the peel shim 28. While only a sector of the peel shim 28 is shown in FIG. 3, it will be appreciated that the peel shim 28 may be formed as a substantially integral annulus, a disk, or may be formed from one or more sector portions such as the one shown in FIG. 3; the peel shim 28 may have a sector shape or a disc shape or an annular shape. The peel shim 28 may have a frusto-conical shape, having a flat central portion and a tapered radially outer portion 30. Alternatively, the peel shim 28 may have a cross section which is substantially triangular and so may form a conical shape or may have a curved surface arranged to contact the friction member 26. The tapered portion 30 can be configured to lie between the friction member 26 and the rotor 14 and to maintain a first portion of the friction member 26 at a greater distance from the rotor 14 than a second portion of the friction member 26.

It will be appreciated by the skilled person that, while the peel shim 28 is described above being as substantially circular, the peel shim 28 may have a circular cavity in the centre for receiving a drive shaft of the electric motor or a component of the primary stator 12, and the peel shim 28 may be formed as an annulus.

At a radially outer edge of the peel shim 28, the peel shim 28 may taper to a point. This point may be characterised by the angle of convergence of a first side 29 and a second side 31 at a peel shim angle θ, which is the base angle of a conical or frustoconical peel shim 28. The peel shim angle θ may preferably be less than 10°, more preferably less than 5°.

The peel shim 28 may be attached to the primary stator 12 to the secondary stator 16 at a first portion 27, which may be a radially inner portion of the peel shim 28.

Figure 4:
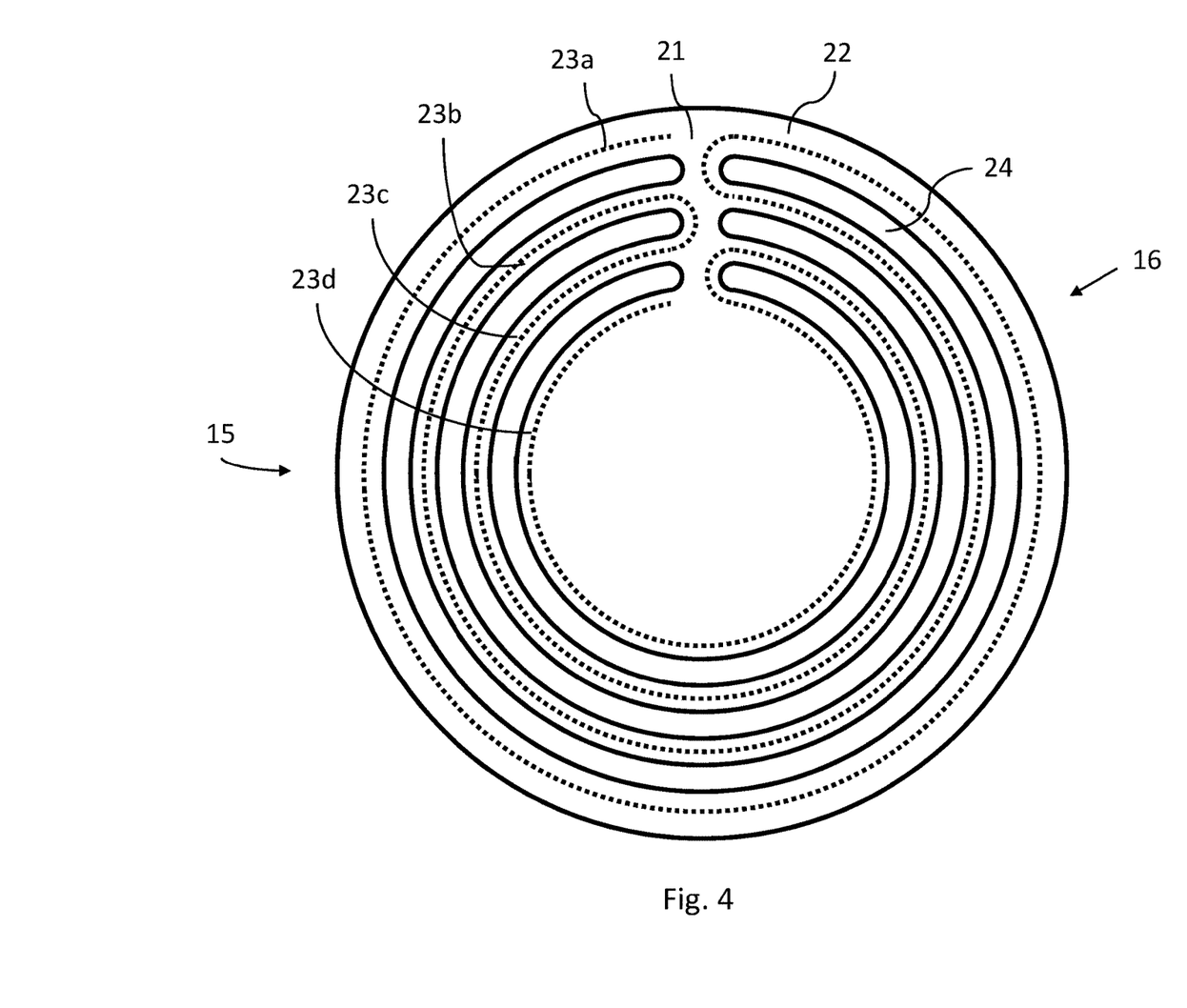
FIG. 4 shows a schematic plan view of a secondary stator.

FIG. 4 shows a plan view of the secondary stator 16. As can be seen from FIG. 4, the secondary stator 16 has a plurality of windings 23a, 23b, 23c, 23d, which are placed in circumferential slots 22, the windings 23a, 23b, 23c, 23d follow a plurality of concentric circular paths. The windings 23a, 23b, 23c, 23d are arranged such that the current direction between adjacent circumferential paths is reversed. The concentric circumferential paths are separated by circumferential stator posts 24a, 24b, 24c, which have alternating polarities. The magnetisation of the stator posts 24a, 24b, 24c is caused by the current through the windings 23a, 23b, 23c, 23d.

Every second stator post 24a, 24c may have the same polarity because the stator posts 24a, 24b, 24c alternate polarity. Every second circumferential windings 23a, 23c, may have the same current direction, which is opposite to the interleaving windings 23b, 23d as the windings parts 23a, 23b, 23c, 23d, alternate in current direction.

The secondary stator 16 may be formed from a ferrous material such as iron. While the secondary stator 16 may be substantially disc shaped, the alternating stator posts 24 and slots 22 may be formed as respective extrusions and recesses in the disc.

In order that adjacent circumferential windings 23a, 23b, 23c, 23d can be formed from the same wires, thus requiring a lower number of wires, the secondary stator 16 may have a radial slot 30, for containing wires connecting the adjacent concentric windings 28.

The combined effect of the windings 28 and stator posts 24 is to form an electromagnet 15. As will be appreciated in light of the earlier figures and their description, the electromagnet 15 can be used to attract the friction member 26 away from the rotor 14 to reduce a braking torque between the friction member 26 and the rotor 14, to allow the rotor 14 to rotate.

Figure 5:
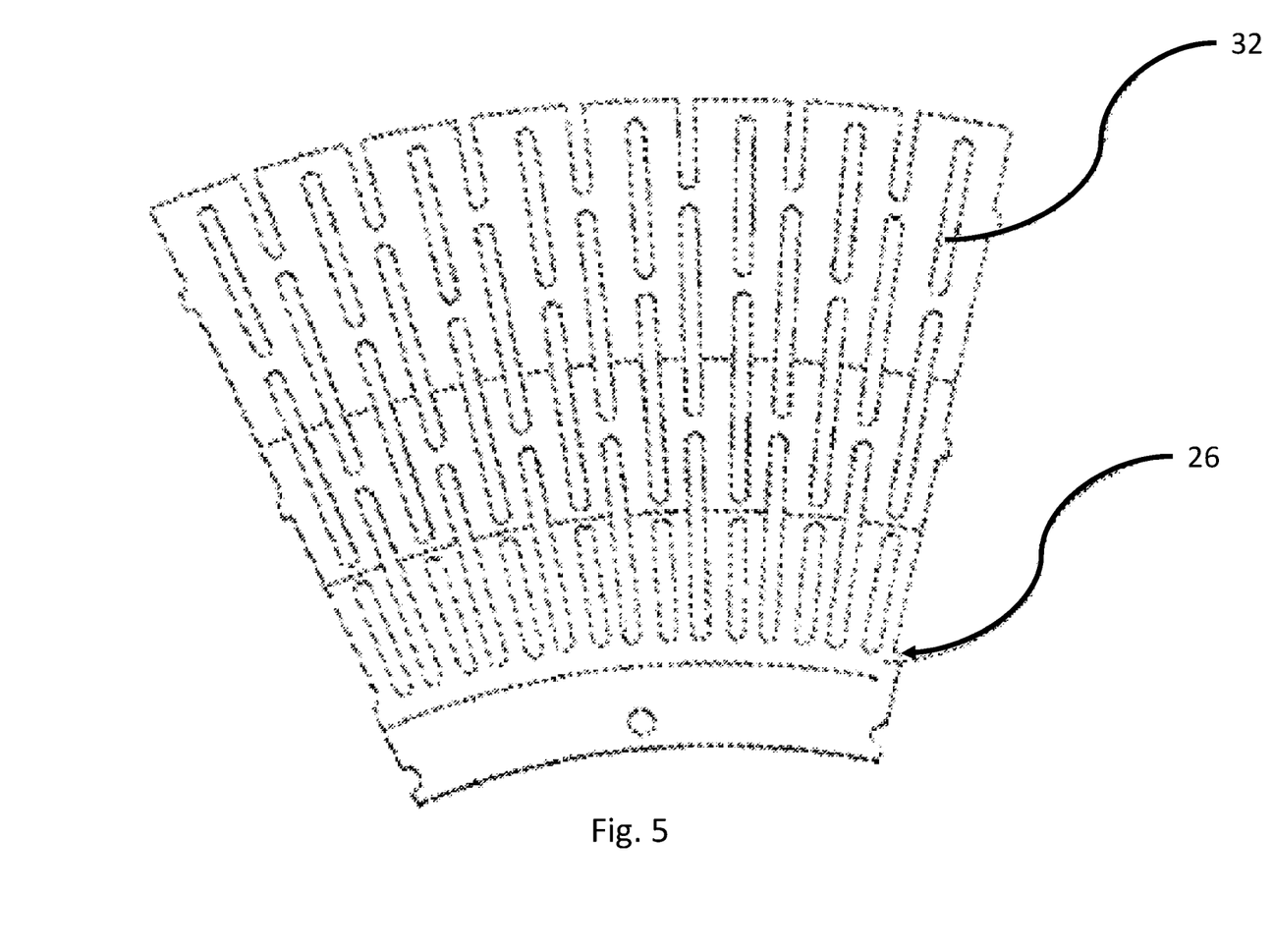
FIG. 5 show a plan view of a sector of a friction member.

FIG. 5 shows a plan view of a sector of the friction member 26. As can be seen from FIG. 5, the friction member may comprise a plurality of radially elongated voids 32. The friction member 26 preferably comprises aluminium bronze, in order to achieve a high brake force.

Similarly to the peel shim 28, the friction member 26 can be formed as an integral disc from a single part or can be formed from a series of sector parts. The friction member 26 can have a circular shape or a sector shape.

The voids 32 may be elongated such that they each extend in a radial direction at least twice as far as they extend in a tangential direction. The voids 32 may be formed as sections cut out from the friction member 26. The voids 32 may extend through the friction member 26 or may be recesses which extend only partially through the friction member 26. By correctly arranging the voids 32, the stiffness of the friction member 26 can be tailored.

The friction member 26 and peel shim 28, while described above as being flat and circular for application to a face of the rotor 14, could be applied to a circumferential side of the rotor 14 and in such an embodiment the friction member 26 and/or the peel shim 28 may be curved in order to apply friction evenly to the curved outer side of the rotor.

While the above disclosed embodiments refer to an axial flux electric motor, the teaching could be applied analogously to a radial flux electric motor.

Figure 6:
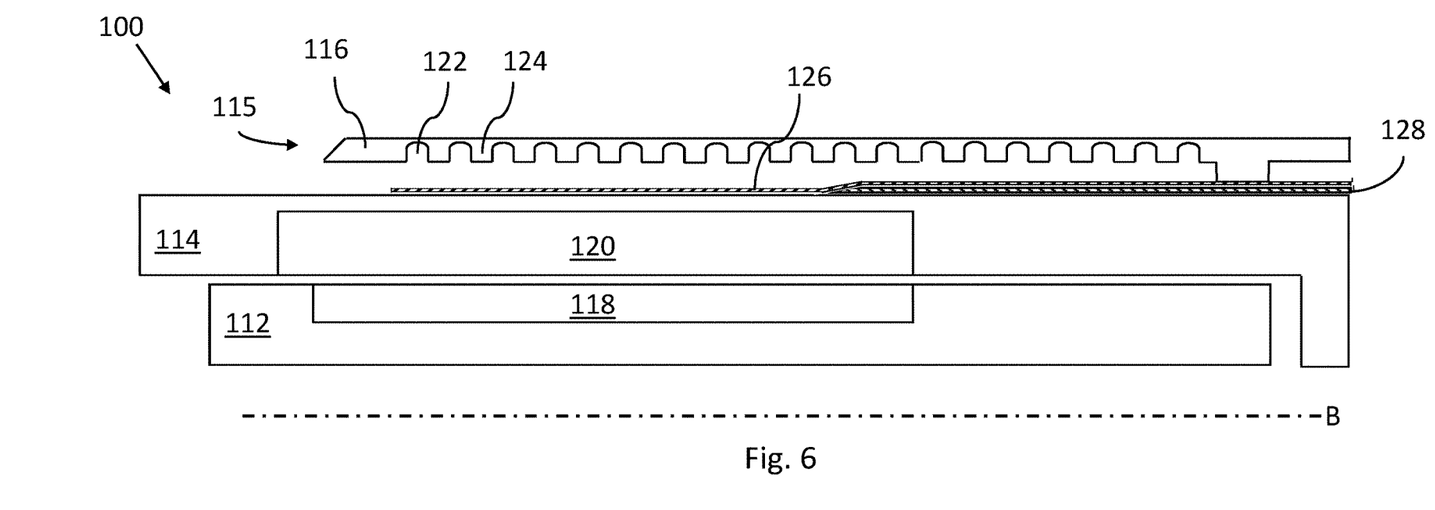
FIG. 6 shows a half cross-section of a radial flux electric motor according to the invention where a braking torque is being generated.
Figure 7:
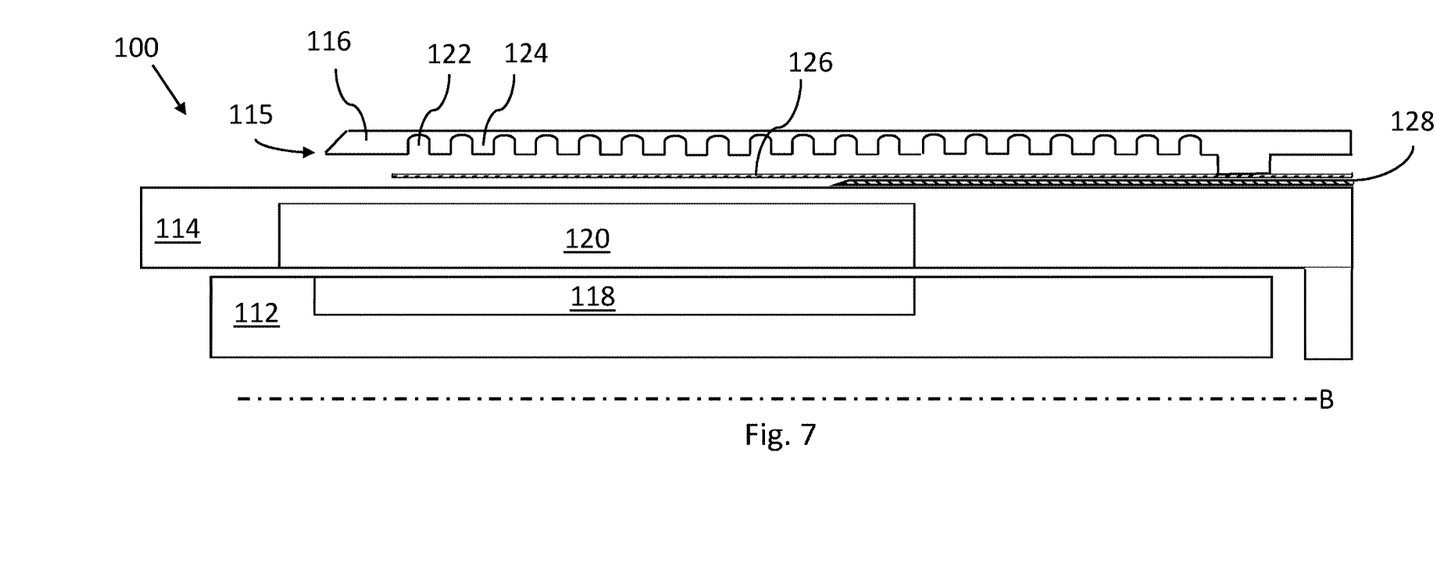
FIG. 7 shows a half cross-section of a radial flux electric motor according to the invention in which a braking torque is not being generated.

FIGS. 6 and 7 each show a half cross-section of an embodiment of a radial flux electric motor comprising features of the present invention. The electric motor 100 operates by rotating the substantially cylindrical rotor 114 about the axis B. The motor 100 generates a driving torque by providing a rotating magnetic field with the electromagnet 118 situated in the primary stator 112, which may be considered as a drive stator. The rotating magnetic field interacts with the permanent magnet 120 situated within the rotor 114 in order to generate a torque about an axis B.

In the arrangement shown in FIG. 6, a braking torque is generated by a friction member 126 impinging upon the rotor 114. This is caused by attraction between the permanent magnet 120 and the friction member 126 due to the friction member 126 being formed from a magnetically susceptible material, such as a ferrous material. However, it is also envisioned that the friction member 126 could be biased toward the rotor 114 by a biasing force generated by other means such as springs or by elastic deformation of the friction member 126.

The friction member 126 maybe separated from the rotor 114, as shown in FIG. 7, by applying a magnetic field to the friction member 126 using the secondary stator 116, which comprises an electromagnet 115 and may be considered a brake stator. The electromagnet 115 of the secondary stator 116 may comprise a plurality of windings, situated in slots 122 and a plurality of stator posts 124. The secondary stator 116 may be rigidly fixed to the primary stator 112, for example via a casing (not shown) extending around the rotor 114.

The friction member 126 may be separated from the rotor 114 across at least a portion of its area by the peel shim 128. FIG. 6 shows that the peel shim 128 has the effect that only a portion of the friction member 126 contacts the rotor 114 when the friction member 126 contacts the rotor 114 to generate a braking torque.

Since a portion of the friction member 126 contacts the rotor 114 and is further from the secondary stator 116 and another portion of the friction member 126 is separated from the rotor 114 and is closer to the secondary stator 116, when the electromagnet 115 of the secondary stator 116 is initially energized, the friction member 126 can separate from the rotor 114 in a wave-like fashion, with a line of separation moving axially in a direction of axis B, and the portion of the friction member 126 in contact with the rotor 114 is gradually reduced. Therefore, the force required to move the friction member 126 from a position in which it contacts the rotor 114 to a position in which the friction member 126 does not contact the rotor 114 is reduced.

The peel shim 128 shown in FIG. 6 may be substantially annular and so may separate a portion of the friction member 126 from the rotor 114.

The peel shim 128 may be annular or may be a curved sheet formed as a sector of an annulus and may be disposed at an axial portion of the friction member 126 near a point where the friction member 126 is attached to the primary stator 112 and/or secondary stator 116.

In this example, the peel shim 128 does not contact the rotor 114.

The friction member 126 and the peel shim 128 may take the form of cylindrical sleeves or curved sheets as appropriate, in order to contact the cylindrical rotor 114 of the electric motor 100. In such an arrangement, the secondary stator 116 may be disposed radially outside the friction member 126 and may have circumferential windings, in slots 122 and stator posts 124, the stator posts 124 alternating polarity axially along a direction of axis B and the windings within the slots 122 alternating current direction axially along a direction of axis B.

In a radial flux motor, the friction member 126 may have elongate voids, which are axially elongated such that the voids each extend axially at least twice as far as they extend circumferentially. The peel shim 128 may have a tapered axial portion, which tapers toward an axial end of the peel shim 128.

Further, the above teaching may also be applied to a motor where the rotor comprises an electromagnet and the stator comprises a permanent magnet. In such an example, the friction member, may, for instance, be fixed to the stator and biased toward the rotor by a spring. Alternatively, the friction member may be fixed to the rotor and may be biased toward the stator, an electromagnet in the rotor providing a sufficient force for detaching the friction member from the stator in order to move the friction member such that no braking torque is generated.

In certain non-limiting examples, the secondary stator 16, 116 may be considered a first element of the electric motor 10, 100. The rotor 14, 114 may be considered a second element of the electric motor 10, 100 and the primary stator 12, 112 may be considered a third element of the electric motor 10, 100.

Alternatively, the friction member 26, 126 may be fixed to the primary stator 12, 112 and the primary stator 12, 112 may be considered a first element of the electric motor 10, 100.

Where the primary stator 12, 112 may comprise a permanent magnet and the rotor 14, 114 may comprise an electromagnet, the primary stator 12, 112 may be considered a second element of the electric motor 10, 100 and the rotor 14, 114 may be considered a first element of the electric motor 10, 100.

Although the invention has been described above with reference to one or more preferred embodiments, it will be appreciated that various changes or modifications may be made without departing from the scope of the invention as defined in the appended claims.

The invention claimed is:

1. An electric motor comprising:
    a first element having at least one electromagnet,
    a second element, rotatable relative to the first element about an axis, the second element comprising at least one permanent magnet, wherein the electric motor is arranged to generate a torque by applying a rotating magnetic field to the at least one permanent magnet of the second element, and
    a friction member coupled to the first element such that the friction member is non-rotatable relative to the first element about the axis, the friction member comprising a magnetically susceptible material and being biased by a first biasing force toward the second element,
    wherein the first element, the second element and the friction member are configured such that:
        when the electromagnet is not energized, the first biasing force causes the friction member to contact the second element to generate a braking torque, and
        when the electromagnet is energized, the friction member is biased by a second biasing force generated by the electromagnet such that the braking torque is reduced.

2. The electric motor of claim 1, wherein the first element is a stator of the electric motor and the second element is a rotor of the electric motor.

3. The electric motor of claim 1, further comprising a third element, which is fixed relative to the first element, the third element being disposed on an opposite side of the second element to the first element, the third element having a further electromagnet arranged to generate the rotating magnetic field.

4. The electric motor of claim 1, wherein, the friction member is configured such that, when the electromagnet is not energized, the friction member deforms such that the friction member contacts the second element.

5. The electric motor of claim 1, wherein the friction member is fixedly mounted relative to the first element at a first portion of the friction member and comprises elongate voids, extending in a direction away from the first portion.

6. The electric motor of claim 5, wherein the elongate voids extend toward a second, movable portion of the friction member, wherein the second, movable portion is movable by the first biasing force toward the second element.

7. The electric motor of claim 1, further comprising a peel shim arranged between the friction member and the second element, the peel shim being arranged to separate a portion of the friction member from the second element.

8. The electric motor of claim 7, wherein the peel shim is rotationally symmetric about the axis.

9. The electric motor of claim 7, wherein the peel shim has a tapered portion.

10. The electric motor of claim 9, wherein the peel shim is mounted to the first element at a first portion and the tapered portion tapers in a direction away from the first portion.

11. The electric motor of claim 1, wherein the first element comprises a plurality of concentric windings, the windings arranged such that the current in a first winding is in an opposite direction to the current in at least one second winding radially adjacent to the first winding.

12. The electric motor of claim 11, wherein the first element comprises a plurality of concentric posts disposed between the concentric windings, the polarities of the posts alternating radially.

13. The electric motor of claim 1, wherein the first element comprises a radial slot for receiving windings.

14. The electric motor of claim 1, wherein the permanent magnet generating the biasing force and the permanent magnet to which a rotating magnetic field is applied are the same permanent magnet.

15. An electric motor comprising:
    a first element having at least one electromagnet,
    a second element, rotatable relative to the first element about an axis, the second element comprising at least one permanent magnet, wherein the electric motor is arranged to generate a torque by applying a rotating magnetic field to the second element, and
    a friction member coupled to the first element such that the friction member is non-rotatable relative to the first element about the axis, the friction member comprising a magnetically susceptible material and being biased by a first biasing force toward the second element, wherein the first element, the second element and the friction member are configured such that:

when the electromagnet is not energized, the first biasing force causes the friction member to contact the second element to generate a braking torque, and when the electromagnet is energized, the friction member is biased by a second biasing force generated by the electromagnet such that the braking torque is reduced, and wherein the friction member is fixedly mounted relative to the first element at a first portion of the friction member and comprises elongate voids, extending in a direction away from the first portion.

16. The electric motor of claim 15, wherein the elongate voids extend toward a second, movable portion of the friction member, wherein the second, movable portion is movable by the first biasing force toward the second element.

17. An electric motor comprising:
a first element having at least one electromagnet,
a second element, rotatable relative to the first element about an axis, the second element comprising at least one permanent magnet, wherein the electric motor is arranged to generate a torque by applying a rotating magnetic field to the second element,
a friction member coupled to the first element such that the friction member is non-rotatable relative to the first element about the axis, the friction member comprising a magnetically susceptible material and being biased by a first biasing force toward the second element, and
a peel shim arranged between the friction member and the second element, the peel shim being arranged to separate a portion of the friction member from the second element,
wherein the first element, the second element and the friction member are configured such that:
when the electromagnet is not energized, the first biasing force causes the friction member to contact the second element to generate a braking torque, and
when the electromagnet is energized, the friction member is biased by a second biasing force generated by the electromagnet such that the braking torque is reduced.

18. The electric motor of claim 17, wherein the peel shim is rotationally symmetric about the axis.

19. The electric motor of claim 17, wherein the peel shim has a tapered portion.

20. The electric motor of claim 19, wherein the peel shim is mounted to the first element at a first portion and the tapered portion tapers in a direction away from the first portion.

21. An electric motor comprising:
a first element having at least one electromagnet,
a second element, rotatable relative to the first element about an axis, the second element comprising at least one permanent magnet, wherein the electric motor is arranged to generate a torque by applying a rotating magnetic field to the second element, and
a friction member coupled to the first element such that the friction member is non-rotatable relative to the first element about the axis, the friction member comprising a magnetically susceptible material and being biased by a first biasing force toward the second element,
wherein the first element, the second element and the friction member are configured such that:
when the electromagnet is not energized, the first biasing force causes the friction member to contact the second element to generate a braking torque, and
when the electromagnet is energized, the friction member is biased by a second biasing force generated by the electromagnet such that the braking torque is reduced, and
wherein the first element comprises a plurality of concentric windings, the windings arranged such that the current in a first winding is in an opposite direction to the current in at least one second winding radially adjacent to the first winding.

22. The electric motor of claim 21, wherein the first element comprises a plurality of concentric posts disposed between the concentric windings, the polarities of the posts alternating radially.

* * * * *